United States Patent [19]

Newcomb, Jr.

[11] 4,050,718
[45] * Sept. 27, 1977

[54] VEHICLE LEVELER SYSTEM

[76] Inventor: C. Lewis Newcomb, Jr., 520 11th Ave., Haddon Heights, N.J. 08035

[*] Notice: The portion of the term of this patent subsequent to May 6, 1992, has been disclaimed.

[21] Appl. No.: 574,373

[22] Filed: May 5, 1975

Related U.S. Application Data

[63] Continuation of Ser. No. 316,472, Dec. 19, 1972, Pat. No. 3,881,746.

[51] Int. Cl.² .............................................. B60S 9/02
[52] U.S. Cl. ................................................... 280/763
[58] Field of Search ..................... 280/150.5, 475, 763; 296/23 R; 254/94; 248/354 R

[56] References Cited

U.S. PATENT DOCUMENTS

| | | | |
|---|---|---|---|
| 416,519 | 12/1889 | Troxell | 280/150.5 X |
| 1,081,013 | 12/1913 | Bunn | 254/94 X |
| 1,727,430 | 9/1929 | Gilkison | 280/150.5 |
| 2,343,459 | 3/1944 | Hines | 254/94 |
| 3,093,362 | 6/1963 | Schaefer | 280/150.5 X |
| 3,355,136 | 11/1967 | Staples | 280/150.5 X |
| 3,857,582 | 12/1974 | Hartog | 280/150.5 |
| 3,881,746 | 5/1975 | Newcomb | 280/763 |

Primary Examiner—Philip Goodman
Assistant Examiner—R. Schrecengost
Attorney, Agent, or Firm—Morton C. Jacobs

[57] ABSTRACT

A system for leveling vehicles such as those used for family camping employs a plurality of jacks secured to the front and rear bumpers of the vehicle. The jacks are adjustable in length and are pivoted to the front and rear bumpers and have a ground engaging fulcrum portion. When the vehicle is driven against the jacks, it tends to rotate the jacks into a vertical condition around the ground engaging ends of the jacks, and thereby partially lifts the vehicle off its spring suspension an amount corresponding to the height of the jack. To restore the vehicle to its operating condition, it need only be driven in a reverse direction, rotating the jacks out of their vertical condition and restoring the full weight of the vehicle to its spring suspension.

7 Claims, 6 Drawing Figures

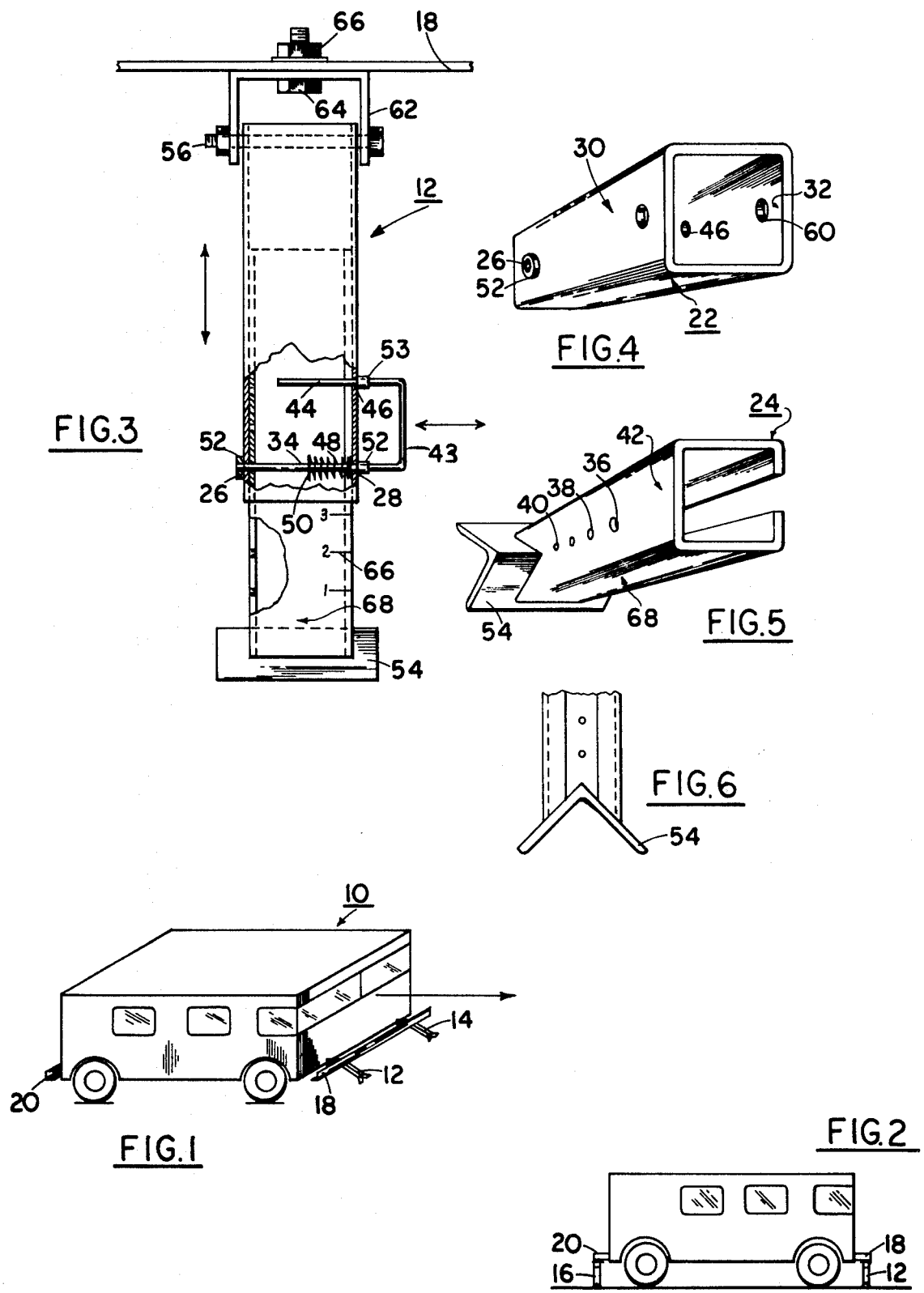

VEHICLE LEVELER SYSTEM

BACKGROUND OF THE INVENTION

This invention relates to a system for leveling vehicles such as those used for family camping and mobile homes, and constitutes a continuation of my co-pending application Ser. No. 316,472, filed Dec. 19, 1972 and now Pat. No. 3,881,746.

Family campers and mobile homes customarily require leveling when set up for overnight in campgrounds or similar tourist grounds. The ground is usually quite uneven or inclined, and, unless the vehicle can be leveled, the living facilities (e.g., beds, floors, sinks) are unpleasantly out of level.

Hydraulic jacks located at the four corners of the vehicle have been used to raise portions of the vehicle to achieve the desired level condition. However, such jacks are usually quite expensive, and many campers resort to chocking up the wheels of the tilted vehicle to correct its out-of-level condition.

SUMMARY OF THE INVENTION

Accordingly, it is among the objects of this invention to provide a new and improved vehicle leveler system.

Another object is to provide a vehicle leveler system which is relatively inexpensive to manufacture and use.

Another object is to provide a vehicle leveler for over-the-road vehicles used for camping or as mobile homes to provide quick and reliable leveling of the vehicle.

In accordance with one embodiment of this invention, a vehicle leveler system employs a plurality of jacks, one at each corner of the over-the-road vehicle and attached to the spring-suspended vehicle body. For example, the jacks may be attached to the ends of the front and rear bumpers. Each jack includes two members, one telescoping within the other for adjustment of the height of the jack. One of the members has a ground-engaging fulcrum portion at its lower end, and the other member is pivotally secured to the bumper at its upper end. In use, the jack members are individually adjusted to overall lengths that provide the desired height of the spring-suspended vehicle in the level condition. In this adjusted condition, generally all of the jacks extend a greater amount than the height of the bumper of the vehicle in its normal unleveled condition.

These jacks are all oriented to extend in the same direction, either tilting forwardly or rearwardly from the vehicle. The vehicle is operated to be driven in the direction of the jacks so that they are pivoted into vertical condition about the ground-engaging end. As the jacks are tilted vertically, they elevate the spring-suspended vehicle different amounts to bring it into the required level condition. Similarly, to restore the vehicle to its normal driving condition, it need only be driven in the reverse direction rotating the jacks out of their vertical condition to restore the full weight of the spring-suspended vehicle to its spring mounting. During normal driving of the vehicle, the jacks may be moved up out of the way and there retained.

BRIEF DESCRIPTION OF THE DRAWING

The foregoing and other objects of this invention, the various features thereof, as well as the invention itself, will be more fully understood from the following description, when read together with the accompanying drawing, in which:

FIG. 1 is a perspective view of a leveler system embodying this invention, illustrated as attached to a bumper of a camper vehicle;

FIG. 2 is a side view of the vehicle of FIG. 1, with the leveler system suspending the vehicle in level condition;

FIG. 3 is a front view of one of the jacks used in the leveler system of FIG. 1, with parts broken away;

FIG. 4 is a perspective view of the upper tubular member of the jack of FIG. 3;

FIG. 5 is a perspective view of the lower tubular member of the jack of FIG. 3; and FIG. 6 is a side view of the lower end of the jack member of FIG. 5.

In the drawing, corresponding parts are referenced throughout by similar numerals.

DESCRIPTION OF A PREFERRED EMBODIMENT

The vehicle 10, illustrated schematically in FIG. 1, may be conventional family camper, a mobile home, or any other vehicle used to provide living quarters when parked. The vehicle is equipped with the leveler system of this invention, which includes a plurality of jacks 12, 14, 16 secured to the frame of the vehicle and preferably two jacks each to the front and rear bumpers 18 and 20 near the ends thereof, as shown for the front bumper 18 in FIG. 1.

Each jack is formed of two tubular members 22 and 24, with the lower one 24 telescoping within the upper one 22. The members are formed in rectangular shape in order to prevent relative rotation. Holes 26 and 28 through the side walls 30 and 32 of the upper member 22 slidably receive a pin 34 which also passes through an aligned one of a series of adjustment holes 36, 38, 40 in the side wall 42 of the lower member.

The pin 34 is connected integrally, in one form of the invention, with a U-shaped handle 42, the upper arm 44 of which is guided in a hole 46 in the side wall 32 of the upper member 22. The pin 34 is biased by a spring 48 compressed between the inner surface of wall 32 and a stop 50 on the pin 34 to maintain the pin normally engaged through one of the holes 36 to 40 in the lower member 24, and through the aligned hole 26 in member 22. Bearing bushings 52 surround holes 26 and 28 on opposite sides of member 22 and provide bearing support for pin 34, and bushing 53 at hole 46 guides handle arm 44. A T-shaped handle for the pin 34 has also been found to be suitable.

An A-shaped angle 54 is formed at the lower end of the lower member 24 and serves as an angulated edge to bite into the ground in the jacking operation and to serve as a fulcrum for elevating the vehicle. Other ground-engaging shapes may also be used for this purpose.

The upper member 22 is pivotally suspended by means of a bolt 56 which passes through a pair of aligned holes 58 and 60 in the side walls 30 and 32 and through the legs of a U-channel hanger 62. The hanger is itself pivotally suspended by a swivel bolt 64 which passes through the web of the hanger 62 and through a frame portion of the vehicle, such as a horizontal bar of the bumper 18, which is spring-suspended on the axles of the vehicle. The bolt 64 is secured to the bumper 18 by means of a lock washer and nut 66, and a suitable bearing such as a nylon washer (not shown) is provided between the web of the hanger 62 and the bumper 18; thereby the bolt 64 provides a vertical swivel pin for the jack, which assists in moving the jack out of the way when not in use.

In use, four such jacks 12, 14, 16 are provided for the four corners of the vehicle. In ordinary use the vehicle, such as a family camper, must often be parked on uneven or inclined ground so that the floors, beds, sinks and other facilities of the vehicle are tilted unpleasantly or so that they do not function unless the vehicle is properly restored to substantially level condition. The operator is able to approximate the amount of leveling required at each corner of the vehicle and to adjust the jack for each corner by extending the lower member 24 a suitable amount as indicated by the location of the bottom edge of member 22 with respect to a graduated scale 66 along the front face 68 of the lower member. By adjustment of the pin 34 with the handle 42, the operator sets the adjustment of the two members to the desired telescoped extension. Each jack may be individually adjusted to a length appropriate for the desired upward lifting of the vehicle (e.g. a matter of a few inches). Generally, each of the jacks is adjusted to a length greater than the normal height of its bumper above the ground when the vehicle is in its normal condition of suspension from its spring mounts, whereby a lifting action takes place at all four corners.

Prior to the lifting operation, the jacks are tilted to project in the same direction. For example, as shown in FIG. 1, the jacks 12 and 14 are tilted to project forwardly of the vehicle, and similarly the jacks 16 on the rear bumper 20 are tilted forwardly. The vehicle is then driven forwardly, and as it moves it tends to rotate the jacks 12, 14 and 16 about the edge of the ground-engaging angle 54, which acts as a fulcrum. In rotating the jacks to a vertical condition (as illustrated in FIG. 2), the spring-suspended frame of the vehicle rides up onto the jacks and sits there, with the heights of the corners of the vehicle adjusted to the heights established by the jacks. All four wheels continue to rest on the ground. Thereby, the vehicle is retained in substantially level condition. Alternatively, the jacks may all be set up initially to project in the rearward direction (opposite to that shown in FIG. 1) and the vehicle driven in reverse to raise the heights of its corners to the different lengths of the jacks, thereby leveling it.

To restore the vehicle to the normal driving condition, it is driven in the reverse direction from that in which it was raised (or, where appropriate, it may be driven further in the same direction as that in which it was raised), to rotate the jacks out of the vertical condition and restore the vehicle to the condition in which its weight is fully supported by its spring suspension. If the initial leveling operation does not produce the desired fully level condition, the vehicle may be driven off the jacks, the lengths of the jacks readjusted appropriately, and the vehicle then driven back up on the jacks. Since this operation is a relatively simple one to perform, it may be repeated until the desired leveling is achieved.

When not in use, the jack may be rotated ninety degrees about the vertical swivel bolt 64 so that the axis of the bolt 56 extends along the forward axis of the vehicle. Then the jack 12 may be rotated about the horizontal pivot bolt 56 to extend along the bumper 18 in a generally horizontal condition. An appropriate spring detent (not shown) may be provided on the bumper for retaining the jack in the horizontal out-of-the-way condition, or other suitable securing means may be used to tie or otherwise retain it in that condition.

The jack as illustrated is rotatable about the pivot bolt 64, either forwardly or rearwardly, depending upon the initial tilted condition in which the jack is set up. Alternatively, a stop plate may be attached to the hanger 62 to extend between the two legs thereof and down sufficiently to be in the way of the upper member 22. Thereby, when the jack is rotated into the vertical condition, it will hit against the stop plate to cue the driver of the vehicle to the fact that the jacks are then in the vertical condition and prevent the vehicle from being overdriven beyond the vertical. Because of the swivel bolt 64, the jacks may be rotated for either forward or reverse operation of the vehicle during lifting.

Thus it is seen that a new and improved vehicle leveler system is provided by means of this invention. It is formed of easily fabricated parts which may be constructed of steel and are thereby relatively inexpensive. The attachment of the jacks to a vehicle is readily performed and does not require any special skills, and the mechanisms of the jacks are quite simple so that the jacks do not require servicing. Thus the vehicle leveler system of this invention is relatively inexpensive to manufacture and use, and provides quick and reliable leveling of vehicles such as family campers in campgrounds.

This invention provides a quick and effective vehicle leveler system which is useful for motor homes, pick-up campers and camper vans which are self-propelled as a transporting vehicle and therefore must be moved frequently in and out of the campground position, in which they have been leveled. The leveling for a new campsite is relatively quick, as described above, and quite often only two jacks are required, either at the forward or rear bumper, to achieve the desired leveled condition at a particular campsite. Though four jacks, as described above, are preferred since, for example, the two left side jacks (or two right side jacks) may be required for a particular instance, for many uses two jacks may be sufficient. Moreover, in use, once a correct adjustment of the jacks is made for a campsite, and the vehicle is moved for sightseeing or shopping and is returned to its parking space, no further adjustment is required. For the jacks, when the vehicle is moved, are simply rotated about swivel 64 and then out of the way about pivot bolt 56 and secured to the bumper for storage without changing the jack adjustment. Thus, this adjustment is retained when the vehicle is returned to the same spot, and the jacks need only be lowered, and the vehicle is driven up on to them.

Other forms of this invention will be apparent to those skilled in the art from the above description. For example, the ground-engaging angle 54 may be formed as an inverted U-shape or an inverted cup shape, or other shapes suitable for providing a good frictional engagement with the ground during the jacking operation may be employed. Similarly, the tubular telescoping members may take various shapes, the length adjustment and other features may be achieved and constructed in various ways, all within the skill of the art and within the spirit of this invention as set forth in the following claims.

What is claimed is:

1. A leveler system for an over-the-road vehicle having a spring-suspended frame comprising in combination with said vehicle:
    a plurality of jack devices each having an individually adjustable length, a lower ground-engaging portion on each said device, and means for pivotally securing the upper portion of each said jack device to the spring-suspended frame of the vehicle adjacent a different corner thereof, so that said vehicle can be partially elevated for leveling various individual amounts at each corner by driving the vehicle to move the jack devices in the direction of movement of said vehicle for rotation of the lengths thereof to a vertical condition supporting said vehicle frame and with a partial extension of the spring frame of said vehicle and the vehicle wheels resting on the ground, and so that said vehicle can be restored to normal over-the-road condition by driving the vehicle to rotate said jack devices for the lengths thereof to be inclined to the vertical with said vehicle frame fully spring suspended.

2. A leveler system for over-the-road vehicles as recited in claim 1 wherein each of said jack devices includes a plurality of telescoping members.

3. A leveler system for over-the-road vehicles as recited in claim 2 wherein said ground-engaging portion on the lower of each of said jack members has an edge for frictionally engaging the ground during rotation of the jack device to the vertical condition.

4. A leveler system in combination with an over-the-road vehicle as recited in claim 1, wherein said vehicle is of the motor-home type.

5. A leveler system for over-the-road vehicles as recited in claim 1 wherein said pivotal securing means for each of said jack devices includes means attachable to the bumper of the vehicle for suspending the associated jack device to rotate around a horizontal axis.

6. A leveler system for over-the-road vehicles as recited in claim 1 wherein each of said jack devices includes a plurality of members relatively movable for adjusting the overall length thereof, and means for releasably attaching said members together to have certain overall incremental lengths, said pivotal securing means being connected to one of said members, said releasable attaching means suspending another of said members from said one member.

7. The process of operating an over-the-road vehicle of the motor-home type having a spring-suspended frame and wheels at the four corners of the frame to level said vehicle in stationary condition and to restore said vehicle to normal over-the-road condition by means of the driving force of the vehicle and by the use on said vehicle of a plurality of jack devices respectively mounted adjacent the four corners of the vehicle frame; each of said jack devices having an adjustable length, a lower ground-engaging portion, and means for pivotally securing the upper portion thereof adjacent a corner of the spring-suspended frame of the vehicle;

said process comprising the steps of:

individually adjusting the lengths of said jack devices to be a length greater than the normal height of the associated frame corner above ground but less than the height to elevate the associated wheel off the ground so as to produce a level condition of said vehicle frame when supported on said jack devices;

positioning said jack devices adjacent said frame corners with the ground-engaging portions resting on the ground and projecting out from the associated portions of said vehicle frame in the same direction of planned drive of said vehicle;

driving said vehicle in said direction to rotate said jack devices to project under and support said vehicle frame with partial extension of the spring-suspension of the frame;

and driving said vehicle to rotate said jack devices to project out from the associated portion of said vehicle frame and to restore said vehicle to normal over-the-road condition with said frame fully supported by the spring suspension thereof.

* * * * *